Patented Aug. 2, 1938

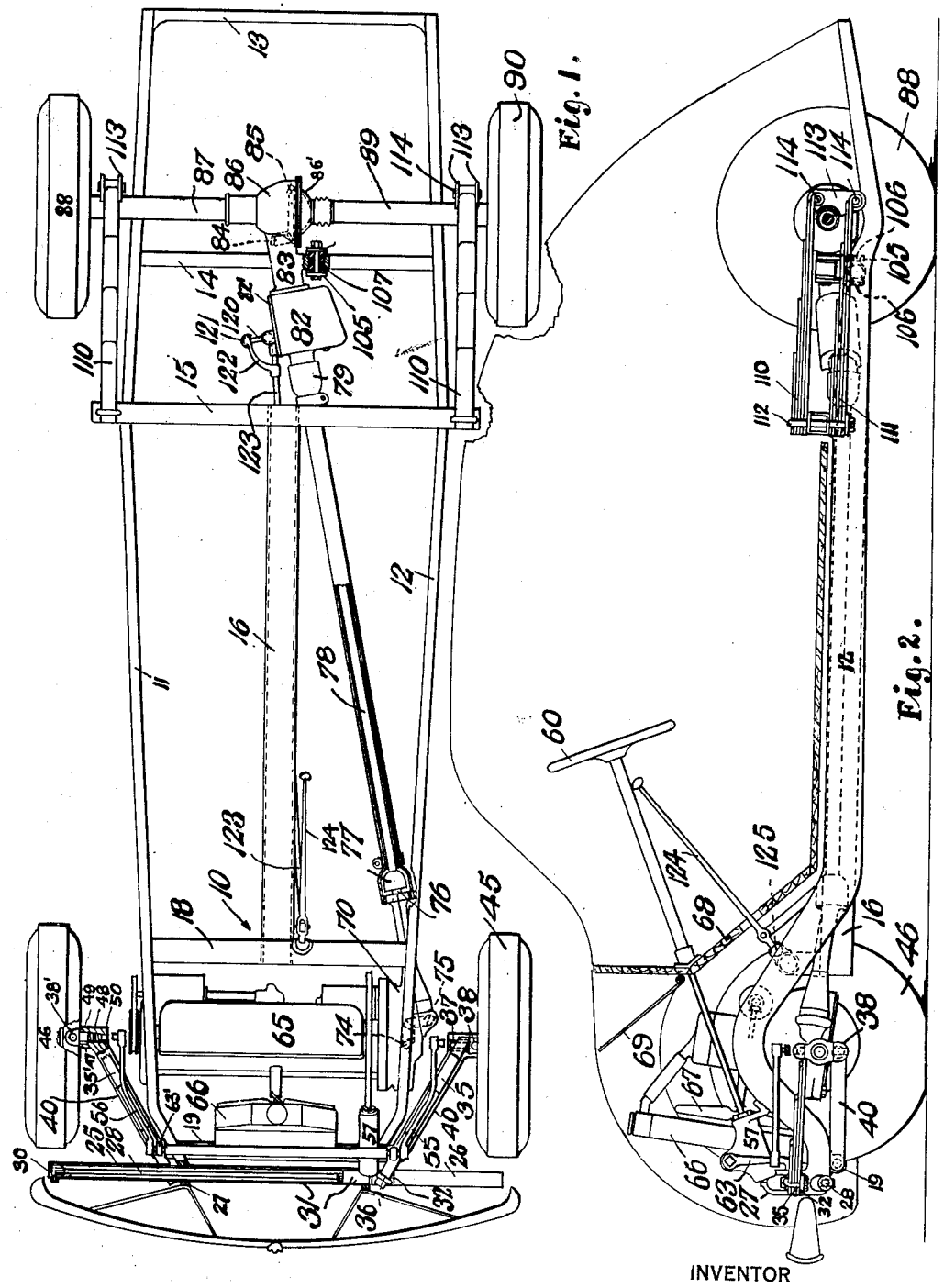

2,125,441

UNITED STATES PATENT OFFICE 2,125,441

AUTOMOBILE CONSTRUCTION

Jules Haltenberger, Ann Arbor, Mich.

Application April 16, 1934, Serial No. 720,746

12 Claims. (Cl. 180—54)

This invention relates to motor vehicles and more particularly to such constructions in which the motor is mounted transversely to the vehicle.

It is the object of my invention to increase the useful space of a motor vehicle by the transverse positioning of the motor and arrange simple driving connections between the motor and the preferably independently suspended driving wheels.

Further and more particularly expressed objects of the invention will appear as the description proceeds.

My invention may be embodied in a motor vehicle as illustrated in the accompanying drawing, wherein Fig. 1 is a plan view of a vehicle chassis, with some parts shown in section; Fig. 2 is a side elevation of the chassis of Fig. 1 including some parts of a body.

Referring to the drawing therein a frame is illustrated generally at 10 and comprising two laterally spaced side members 11 and 12 connected at their rear extremity by a cross member 13, and forward of it by a cross member 14, and still further forward by a hollow cross member 15. Cross member 15 is rigidly connected to hollow central backbone 16, the forward end of which is connected by a spacer to a cross member 18, as by arc welding. Near their front ends side members 11 and 12 are connected by a front cross member 19.

The frame 10 above described can be light and inexpensive and by the use of the tubular backbone 16 is torsion resisting.

The extreme front ends of side members 11 and 12 are arranged to carry cross tubes 25 and 26 as by clamps 27. These tubes are positioned from the front wheel centers at a distance greater than the radius of the tires on the front wheels and extend laterally of the chassis to give a greater length for the torsion springs 28 which they contain. Cross tube 25 is provided at its outer extreme end with a serrated or splined anchor 30 to hold torsion spring 28 from turning. At the other end cross tube 25 is arranged to serve as a bearing for a hub 31 to which is anchored the inner end of spring 28. Where said hub protrudes from cross tube 25 it is formed into a spring pad 32.

On the spring pad 32 is mounted a leaf spring 35, held as by U-clip 36. The rear end of the main leaf of leaf spring 35 is formed into an upturned eyelet that is provided with a bushing 37 to serve as the upper fulcrum for kingbolt bracket 38. The front cross member 19 is arranged to serve as a bearing for a swinging arm 40, the rear end of which serves as the lower fulcrum for kingbolt bracket 38.

The torsion spring 28, leaf spring 35, swinging arm 40, and kingbolt bracket 38 form the main parts that support the wheel 45, and provide for it an independent suspension. For the other wheel 46, the suspension is substantially the same, there being a torsion spring 28 in cross tube 26 connected through a leaf spring 35' to the kingbolt bracket 38', and a swinging arm 40' mounted in the same manner as for the wheel 45.

The swinging arms 40 and 40' are relied upon to hold their associated wheels in proper camber. This is illustrated in Fig. 1, where the wheel 46 is held by a hub 47 integral with the swinging arm 40' said hub being provided with a spindle 48 that is integral with kingbolt bracket 38 and forms the lower fulcrum of the same. The middle part of the spindle is threaded, as is the middle part of hub 47, and their threaded engagement holds the wheel from lateral motion. The load is taken by needle bearings 49 located outwardly from the threaded portions and arranged in a circle that is larger than the thread, and by needle bearings 50 located inwardly and arranged in a circle that is smaller than the thread, for ease of machinery and assembly.

Wheels 45 and 46 are arranged for steering upon their usual kingbolts and are steered by fore and aft drag links 55 and 56, which at their rear are connected to their respective wheel spindles in the usual way and at their front ends they are operatively connected to a steering chuck 57, usual steering wheel 60 and chuck operated levers 63 and 63'.

The described independent wheel suspension and steering is efficient and also creates a space for a transversely mounted power plant.

The frame side members 11 and 12 carry a crosswise mounted power plant 65 between the front wheels 45 and 46, preferably positioned so that its crankshaft centerline continuation substantially coincides with the front wheel center lines. In front of the power plant a radiator 66 is located and arranged to be cooled by a fan 67 driven from the power plant. To facilitate the exit of the warm air, the air deflecting surface of the toe board 68 is continued by a plate 69, arranged to be hinged out of the way when the power plant is serviced.

One end of the power plant is provided with a usual flywheel housing 70 containing a usual clutch arranged to drive a pinion 74 and therewith meshing gear 75 on stub-shaft 76 (only the rear part is shown). Shaft 76 through a universal joint in housing 77 is operatively connected to a propeller shaft 78.

This shaft extends diagonally and rearwardly and is arranged to drive through a usual universal joint in housing 79 and through a usual change speed mechanism in housing 82 and therewith integral neck 83 a pinion 84.

Pinion 84 is meshed with a differential gear 85 in a differential housing 86, integral with neck 83. To housing 86 is firmly secured a laterally extending axle tubing 87 surrounding a usual rear axle shaft (not shown) to drive wheel 88 in the usual manner. To housing 86 is flexibly mounted a laterally extending axle tubing 89 surrounding a usual rear axle shaft (not shown) to drive wheel 90 in the usual manner.

Parts 86, 87 and 89 form a "hinged axle" described in detail in my Patent No. 1,937,653.

The transmission case 82, neck 83, differential housing 86, axle tubing 87 and wheel 88 form a unit, which is fulcrumed on the cross member 14 by a pair of links 105. The links are directly fulcrumed on the cross member on pins 106 protruding substantially horizontally from the cross member 14, and their upper ends are drawn together against the ends of a compressible rubber bushing in a lateral extension of neck 83 by a through bolt, thereby forming a limited universal fulcrum. The flexibly mounted axle tubing 89 and wheel 90 form a subsidiary unit.

The cross member 15, which is preferably hollow and of square section, is arranged to hold a quarter elliptic spring 110 above its section and a similar spring 111 below its section, as by a U bolt 112. The springs 110 and 111 form a parallelogram, and at their rear they are connected to a bracket 113 arranged to straddle the spring ends and to receive suitable spring bolts 114. As is clear from Fig. 1, each axle unit is supported near its wheel-end by one of such spring systems.

The spring suspension above described is simple and inexpensive, and has the ability to take the driving torque and brake reaction. It has but little unsprung weight and by interposing the linkage 105 between the frame and the rear axle units, the frame and body suspension becomes laterally elastic, as the ends of the four quarter elliptic springs are the anchoring points and they have known lateral elasticity.

The transmission case 82 contains the gearing of a usual gear transmission design now in general use, and the gear changing system can also be the present day standard. The transmission case 82 is provided with a cover 82' on which a short change-speed lever 120 is fulcrumed in the usual way. At the top of the lever is a ball and socket joint 121 connecting the change-speed lever 120 to a lever 122 of a shifting rod 123 that at its forward end is operatively connected to change-speed lever 124 which is pivoted at a ball and socket joint 125 on cross member 18. The shifting rod 123 is mainly placed in hollow backbone 16, and protrudes from it at the forward end, where it is piloted.

Lateral motion of the change-speed lever 124 will slightly turn shifting rod 123, and cause the short change-speed lever 120 to change its gait in the usual way in the transmission.

The described construction is simple; it does permit the use of standard components. By mounting with the engine and clutch only a diagonal stub-shaft the engine unit is relatively short, an important item with transverse installation.

It will be noted that rear driving wheels 88 and 90 are independently suspended on, as best described, a two unit hinged axle. Applicant does not wish to be limited to this construction. He might replace this suspension by the well known three unit hinged axle which is sometimes referred to as a short hinged axle, or other well known independent wheel suspensions.

It is known that rear independent wheel suspensions, because of their materially reduced unsprung weights and thereby increased tire to road contacts, increase the acceleration and deceleration of an automobile. By the same token they improve the directional stability of the vehicle, particularly when a hinged axle is used.

As shown in this preferred form of applicant's construction of a passenger automobile (with a light body), the center of gravity of the relatively heavy engine substantially coincides with the front wheel center lines to counteract the harmful steering effects of this unusually forward position, the change speed transmission is removed from the engine and is placed in the rear of the vehicle. The transmission and the differential forming a sprung weight mass at the rear improve the directional stability and do not affect, or hardly affect, the action of the independently suspended wheels.

Applicant illustrates a transversely disposed front engine. Applicant does not wish to be limited to this front engine position; he might mount the engine in a lengthwise position.

When referring to independently suspended wheels in this patent application the applicant does not include the De Dion drive where the driving wheels are connected by a dead axle; this axle precludes an independent wheel travel or suspension.

I claim as my invention:

1. In an automobile, front wheels, a multi-cylinder powerplant disposed to be cut by a vertical plane containing the wheel centers, and with its crankshaft parallel to said plane, a body dash-board disposed less than one-half the powerplant length from said plane, bevel gears operatively connected at one end of said powerplant, a rear axle, and a universally jointed drive shaft disposed diagonally of said automobile to connect said axle and bevel gears.

2. In an automobile, front wheels, a multi-cylinder powerplant disposed with its crankshaft parallel and near to the center line of said wheels, a pair of bevel gears operatively connected at one end of said engine, a rear axle, a transmission mechanism integral with and operatively connected to said axle, and a universally jointed drive shaft connecting said transmission and bevel gears.

3. In an automobile, front wheels, a multi-cylinder powerplant disposed with its crankshaft parallel and near to the center line of said wheels, a pair of bevel gears operatively connected at one end of said engine, a hinged rear axle having two jointed parts, a transmission integral with one of said parts and operatively connected to drive said rear axle, and a universally jointed shaft connecting said transmission and said bevel gears.

4. In a motor vehicle, a transversely disposed engine, a clutch in transverse alignment with the engine, a longitudinally spaced, jointed, two half, drive axle, said halves arranged for independent suspension, a change speed mechanism associated with the one half of said drive axle, the input side of the change speed mechanism offset transversely to the output side of the clutch, and a drive shaft extending diagonally of the longitudinal vertical plane of the vehicle between the transversely offset clutch and change speed mechanism.

5. In a motor vehicle, a pair of transversely disposed axle shafts arranged for independent suspension, a differential drive therebetween, a housing for said differential drive directly associated with one of said axle shafts, a primary power shaft disposed transversely of the vehicle in longitudinally spaced relation to the axle shafts, change speed mechanism associated with the differential drive, and a propeller shaft extending diagonally to the longitudinal center line of the vehicle and connecting said primary power shaft and the change speed mechanism.

6. In a motor vehicle, a supporting structure, a transversely disposed engine and clutch unit mounted on said structure, a differential drive and variable speed unit including angularly related housings enclosing the differential and variable speed mechanism respectively, means mounting the latter unit oscillatably on the supporting structure, and a universally jointed drive shaft extending diagonally of the engine normally in line with the variable speed housing and coupling said clutch and variable speed mechanism.

7. In a front engined rear wheel drive automobile, front wheels, a multi-cylinder engine disposed with its cylinder-block to be cut centrally by a vertical plane containing the wheel centers, a pair of independently suspended rear driving wheels, a differential disposed therebetween and a change speed transmission integral with said differential, power transmission means between said engine and said transmission and differential and power transfer means between said differential and driving wheels.

8. The invention disclosed in claim 7 where the engine is transversely disposed.

9. In a front engined rear wheel drive automobile, front wheels, a multi-cylinder engine disposed therebetween, a hinged axle supporting a pair of independently suspended rear driving wheels, a differential disposed between said wheels, and a change speed transmission integral with the differential, power transfer means between said engine and said transmission and differential, and power transfer means between said differential and the rear driving wheels.

10. The invention disclosed in claim 9 where the engine is transversely disposed.

11. In a front engined rear wheel drive automobile, front wheels, a multi-cylinder engine disposed therebetween, a two unit hinged axle supporting a pair of independently suspended rear driving wheels, a differential disposed between said wheels and associated with one of said hinged axle units, a change speed transmission integral with the differential, power transfer means between said engine and said transmission and differential, and power transfer means between said differential and said driving wheels.

12. The invention disclosed in claim 11 where the engine is transversely disposed.

JULES HALTENBERGER.